United States Patent Office.

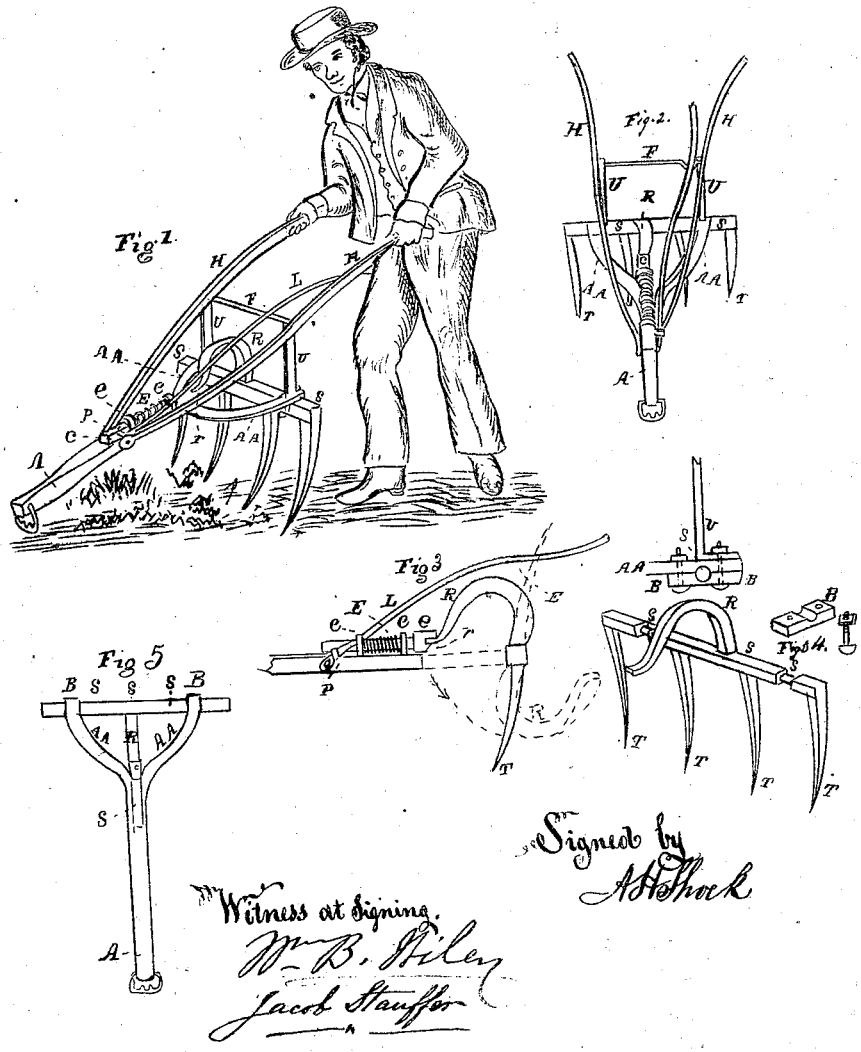

ABRAHAM H. SHOCK, OF PIQUA, PENNSYLVANIA.

Letters Patent No. 66,525, dated July 9, 1867.

---

IMPROVEMENT IN MANURE-DRAG.

---

The Schedule referred to in these Letters Patent and making part of the same.

---

TO ALL WHOM IT MAY CONCERN:

Be it known that I, ABRAHAM H. SHOCK, of Piqua township, in the county of Lancaster, and State of Pennsylvania, have invented a new and useful Improvement on a Manure-Drag; and I do hereby declare that the following is a full, clear, and exact description of the construction and operation of the same, reference being had to the accompanying drawings, making a part of this specification, in which—

Figure 1 is a perspective view of the manure-drag.

Figure 2 a plan view.

Figure 3 illustrates the spring-catch and runner connected with the hook, and the reversed position in dotted lines.

Figure 4 illustrates separate parts.

Figure 5, the biparted pole for the several bearings.

The object of this invention is to supply a defect in this class of manure-drags, allowing the shaft bearing the tines to swing clearly in a reverse position, strengthened by having two side bearings, and providing a hook with a runner centrally attached, on which the empty drag is returned for a fresh load instead of scraping the tines along to catch and drag as others do.

To enable others skilled in the art to make and use my invention, I will more fully describe its construction and operation clearly indicated by the drawings, which being taken from the model are slightly at variance from a full-sized working model in the proportion of the parts and mode of attachment; that is—

The pole A with its bifurcating or branches A A form a portion of the journal for the shaft S or top of the hook. A lower box, B, or other half of the journal is connected by headed screw-bolts to said branch A A on each side for the rounded bearings s on the otherwise square hook-shaft S, the rear bolt also fastening the flange on the uprights U, which support the handles, instead of a short central lock-catch. On S I affix a curved runner, R, (which also answers for a lock-catch.) By this arrangement I obtain two bearings separated to near the ends of my combined shaft and tines or rake-hooks T S, in which bearings the said tine-shaft S could revolve, only that they are arrested by the cross-bar F, and are brought out of the way, so that there is no danger of running the foot into the tines in following the drag, and in this reversed position the central runner R supports the machine, and enables it easily to slide over every obstruction. For setting the hook I employ a notched spring-bolt, E. This has a head, C, bearing the notch for the reception of the catch r on the runner R, and slides through two lugs e on the pole. Between these lugs e there is a coiled spring which presses the notched head C against the projecting catch r aforesaid, and locks the two firmly together. This spring-bolt E has a pin, P, at its forward end, and is actuated by a lever, L. This lever-arm rests in a notch on the cross-bar F, shown in fig. 2.

The operation is such that when the manure is brought to the place of destination it is only necessary to elevate the lever, (this can be actuated also by a compound leverage,) which pressing against the shoulder or peg P on the spring-bolt E pushes it back and releases the runner-catch r from the notched head. The pull of the horse now causes the tines on their common shaft S to revolve, discharge their load, and bring the runner R underneath ready to return for another load. To reset the hook, it is only necessary to raise it, when it will drop into place and lock by its own gravity.

I have been made aware that various devices are patented having the same object in view, but differently arranged, and as the hook portion, and indeed all the parts, (separately considered,) are not new in either of said patents, but the arrangement of said parts constitutes their novelty, I find on close inspection that the arrangements do not fully meet the demand of farmers yet; I therefore present a different combination of the parts, calculated to remove the objections hinted at. I am aware that there is a strong analogy in numerous patents viewed from a certain stand-point, but when we consider the advantages derived from apparently trivial changes, the result differs so substantially that it gives importance to the improved arrangement, and the utility is greatly promoted thereby.

What I claim as my invention, and desire to secure by Letters Patent, is—

The arrangement of the combined central runner R with the revolving hook-shaft S and its bearings s, in combination with the spring-bolt E, with its notched head C, peg or shoulder P operated by the lever L, in the manner and for the purpose specified.

A. H. SHOCK.

Witnesses:
 WM. B. WILEY,
 JACOB STAUFFER.